United States Patent
Kalhan

(10) Patent No.: US 7,245,656 B2
(45) Date of Patent: Jul. 17, 2007

(54) METHOD OF SIGNAL ACQUISITION AND MOBILE STATION USING THE METHOD

(75) Inventor: Amit Kalhan, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 657 days.

(21) Appl. No.: 10/668,706

(22) Filed: Sep. 23, 2003

(65) Prior Publication Data

US 2005/0062645 A1 Mar. 24, 2005

(51) Int. Cl.
 *H04B 1/38* (2006.01)
(52) U.S. Cl. .................................. 375/220; 375/218
(58) Field of Classification Search ................ 375/130, 375/133, 141, 147, 211, 218, 219, 220
 See application file for complete search history.

(56) References Cited

U.S. PATENT DOCUMENTS

| | | | | |
|---|---|---|---|---|
| 5,670,964 | A * | 9/1997 | Dent | 342/457 |
| 6,016,322 | A * | 1/2000 | Goldman | 370/508 |
| 6,075,990 | A * | 6/2000 | Shin | 455/440 |
| 6,085,091 | A * | 7/2000 | Yoo et al. | 455/441 |
| 6,351,644 | B1 * | 2/2002 | Hussain et al. | 455/456.5 |
| 6,405,047 | B1 * | 6/2002 | Moon | 455/456.1 |
| 6,577,616 | B1 * | 6/2003 | Chaudry et al. | 370/342 |
| 6,898,197 | B1 * | 5/2005 | Lavean | 370/335 |
| 7,085,537 | B2 * | 8/2006 | Fernandez-Corbaton et al. | 455/65 |
| 7,113,538 | B1 * | 9/2006 | Chen et al. | 375/150 |
| 2003/0054813 | A1 * | 3/2003 | Riley et al. | 455/424 |
| 2005/0220051 | A1 * | 10/2005 | Lavean | 370/330 |
| 2006/0040616 | A1 * | 2/2006 | Wheatley | 455/67.11 |

OTHER PUBLICATIONS

Sklar, Bernard, 10.5 Synchronization, Chap. 10 Spread-Spectrum Techniques, Digital Communications, 1988, pp. 562-570. Prentice-Hall, Inc., Englewood, NJ, USA.

* cited by examiner

*Primary Examiner*—Emmanuel Bayard

(57) ABSTRACT

Briefly, one way to minimize time and frequency uncertainties when synchronizing between a transmitter and a receiver is to use a position determining method such as global positioning system (GPS) to determine position and velocity. If position can be determined the delay between the transmitter and receiver can be estimated. Additionally, position information can be used to determine the probability that the signal received will be a reflected signal. If the transmitter and receiver are located in an area with obstructions between them then it is more likely that a signal received will be a reflected signal. If it is determined that it is likely that the signal received will be a reflected signal then the receiver can attempt to acquire the transmitted signal over a wider range of propagation delay possibilities. Additionally, another uncertainty that complicates synchronization is uncertainty regarding frequency. One cause for frequency uncertainty is Doppler shift due to movement of the transmitter or receiver. Using a position determining method such as GPS to determine velocity allows the receiver to estimate the Doppler frequency shift and adjust for it.

17 Claims, 4 Drawing Sheets

METHOD OF SIGNAL ACQUISITION AND MOBILE STATION USING THE METHOD

FIELD

The present invention relates generally to electronics, and more particularly to wireless communications devices.

BACKGROUND

Many people use wireless communication systems. In wireless communication systems the information is typically transmitted by electromagnetic waves traveling through the air or other medium. One form of wireless communication is spread-spectrum communication. Spread-spectrum communication systems use a synchronized version of a spreading code to demodulate the received signal. Spreading codes will be discussed below. Typically, the synchronizing process between the locally generated spreading signal and the received spread spectrum signal happens in two parts. The first part is acquisition. During acquisition both signals are coarsely aligned with each other. In other words, the spreading code is rough alignment in time. The spreading code is roughly synchronized. After this coarse alignment the second part, tracking makes fine alignments to maintain the best waveform possible.

The acquisition phase involves searching through time and frequency uncertainty to synchronize a received spread-spectrum signal with a spreading code that has been generated locally. Many uncertainties exist during acquisition. Uncertainty in the distance between the transmitter and receiver of a spread-spectrum communications system leads to uncertainty in the amount of delay between the transmitter and receiver. Delay as a signal travels, for example from a transmitter to a receiver, is known as propagation delay. This can happen between any transmitter and receiver. Several examples are given using a base station and a mobile station.

An example of a spreading code and uncertainty in the distance between the transmitter and receiver will now be discussed. A spreading code is a pseudo-random sequence. The spreading code would typically be used to modulate a spread-spectrum signal at a base station for transmission to a mobile station. Additionally, the spreading code would typically be used to demodulate signals received from the mobile station. A locally generated spreading code 456 will typically be used to demodulate the received signal from the base station and to modulate signals transmitted to the base station.

A locally generated spreading code and the spreading code at the base station are not synchronized initially. One thing that increases the difficulty of synchronizing these two signals, as discussed above, is delay as the signal travels from the base station to the mobile station. Spreading codes will be discussed further with respect to FIG. 10 below.

Additionally, uncertainty regarding a receiver's velocity relative to a transmitter leads to uncertainty regarding Doppler frequency shift of the transmitted signal. A Doppler shift is the change in apparent frequency of a source of electromagnetic radiation or sound when there is a relative motion between the source, in this case the transmitter, and the observer, in this case a mobile handset that is attempting to synchronize with a spread-spectrum communications network.

SUMMARY

One problem in the operation of many wireless communication devices such as, for example CDMA mobile handsets is that both the transmitter and the receiver of a communications signal need to be synchronized. In many cases synchronization may take too long. One reason that synchronization may take too long is that time and frequency are uncertain.

Many things contribute to the time and frequency uncertainty. The relative position of the transmitter and receiver may be unknown, resulting in an uncertainty in the distance between the transmitter and receiver. This distance uncertainty causes an uncertainty in the amount of time taken for a transmitted electrical signal to travel from the transmitter to the receiver. This is known as propagation delay. Additionally, some areas may be more prone to receiving reflected signals, also leading to uncertainty of propagation delay. Electrical signals can be reflected off of objects, for example buildings. Reflections cause uncertainty regarding the path of travel of a signal. An uncertain path of travel can result in uncertainty regarding propagation delay.

In addition to not knowing the position of a transmitter and receiver, velocity may be unknown. Uncertainty regarding velocity translates to uncertainty regarding the apparent change in frequency that is caused when the transmitter and receiver are in motion relative to one another. The apparent change in frequency caused by motion of a transmitter relative to a receiver is known as a Doppler frequency shift. The Doppler frequency shift leads to frequency uncertainty. Doppler frequency shift will be discussed further below.

One way to minimize time and frequency uncertainties when synchronizing between a transmitter and a receiver is to use a position determining method such as global positioning system (GPS) to determine position and velocity. If position can be determined the delay between the transmitter and receiver can be estimated. Additionally, position information can be used to determine the probability that the signal received will be a reflected signal. If the transmitter and receiver are located in an area with obstructions between them then it is more likely that a signal received will be a reflected signal. If it is determined that it is likely that the signal received will be a reflected signal then the receiver can attempt to acquire the transmitted signal over a wider range of propagation delay possibilities.

As stated above, another uncertainty that complicates synchronization is uncertainty regarding frequency. One cause for frequency uncertainty is Doppler shift due to movement of the transmitter or receiver. Using a position determining method such as GPS to determine velocity allows the receiver to estimate the Doppler frequency shift and adjust for it.

Incorporating position and velocity information into the acquisition of a spread spectrum communication system such as, for example, a CDMA network has many advantages. The synchronization and acquisition steps may typically be completed more efficiently. In some cases synchronization and acquisition may be faster. As the antenna beam becomes more narrow less energy is transmitted for a given receive energy at a receive antenna.

A CDMA network is used as an example above. Other air-interfaces are possible. For example, Inter-system acquisition is possible. For example, a CDMA mobile station could be used to acquire an 802.11 network.

BRIEF DESCRIPTION OF THE DRAWINGS

For a more complete understanding of the present invention, and the advantages thereof, reference is now made to the following descriptions taken in conjunction with the accompanying drawings, tables and attachments, in which.

DETAILED DESCRIPTION

Figure 1:
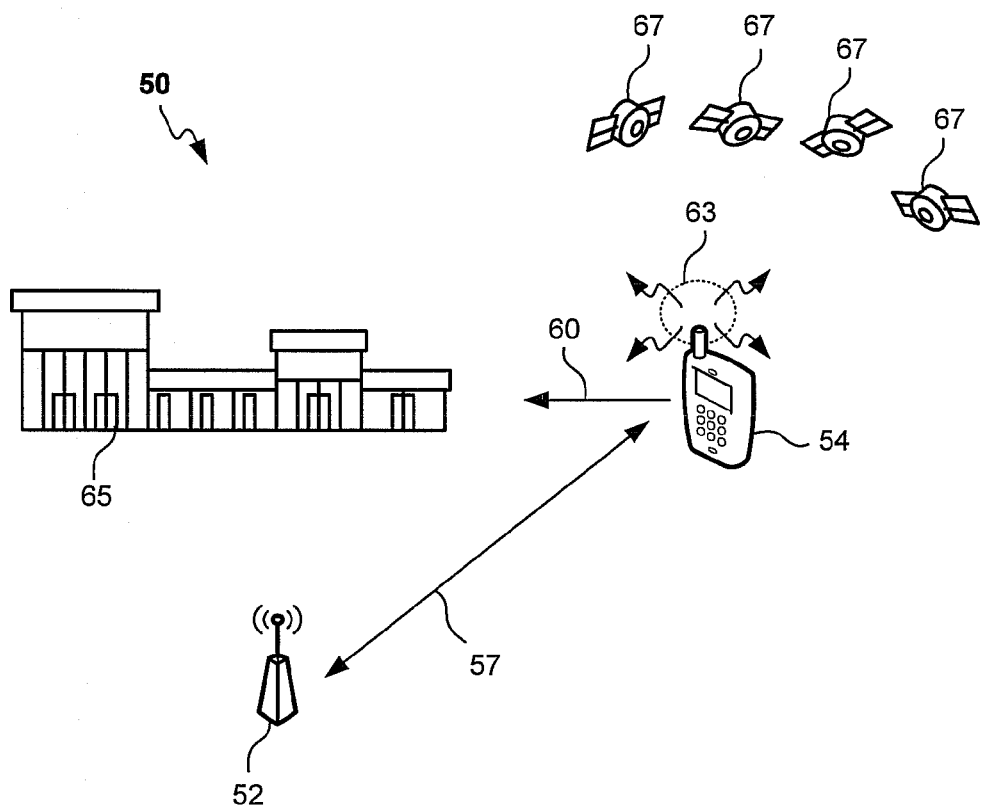
FIG. 1 shows a diagram of a mobile station operating in a communication network.

Referring now to FIG. 1 a mobile station in the form of a mobile handset 54 is shown operating in a communication network. The network includes a base station 52. The base station 52 transmits and receives signals 63 from the mobile handset 54. The mobile handset is some distance 57 from the base station. The distance can be determined if the location of the base station 52 is known and the location of the mobile handset 54 is determined using global positioning system satellites 67. It will be understood by those of skill in the art that other location determination methods are possible. The communication network environment includes open areas and areas that contain many sources of reflection. For example, an urban area 65, would typically tend to be an area that contains many sources of refection. The mobile handset 54 is moving as shown by an arrow indicating velocity 60. Location and motion can inhibit the acquisition of a communication network by complicating the synchronization process between the mobile handset 54 and the base station 52. Several examples of how location and motion complicate the synchronization process will be discussed with respect to FIGS. 2, 3, 4, and 5. An advantage to using relative position or relative velocity to help in the synchronization process is that typically, synchronization can occur more efficiently.

Figure 2:
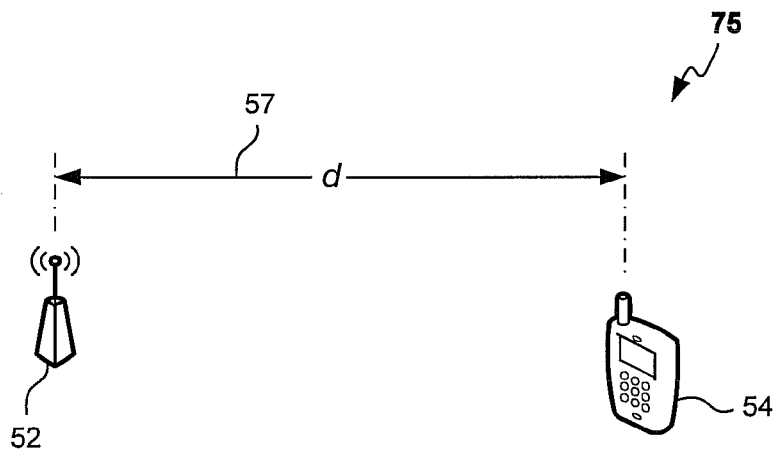
FIG. 2 shows a diagram of estimating chip delay.

Referring now to FIG. 2 a diagram 75 is shown. The diagram 75 shows how a chip delay between a mobile station in the form of the mobile handset 54 and a base station 52 is estimated. One example of how location and motion complicate the synchronization process is caused by chip delay.

Simply stated, the estimated chip delay is the time it takes a signal to travel from the base station 52 to the mobile handset 54, or the distance 57 divided by the speed of light. Chip delay was discussed with respect to FIG. 10. With an estimate of chip delay the spreading code and the locally generated spreading code can typically be synchronized more efficiently.

Figure 3:
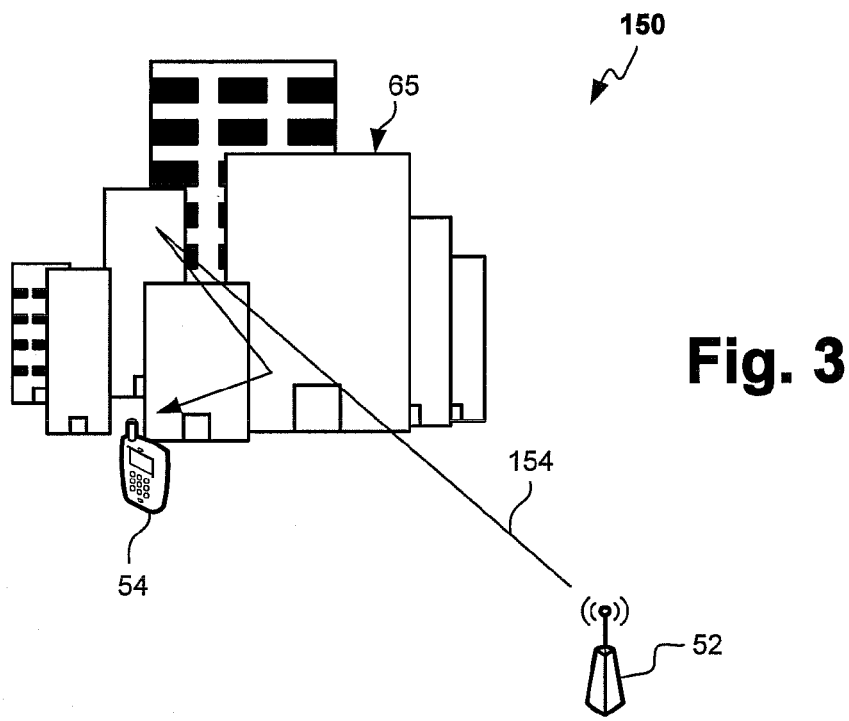
FIG. 3 shows a mobile station in an urban environment with many sources of signal reflection.

FIG. 3 shows a diagram 150 with the mobile handset 54 operating in the urban environment 65. Operating in the urban environment 65 is another example of how location can make signal acquisition more difficult. An urban environment 65 is an example of a environment that typically has many causes of signal reflection. For example, large buildings would tend to reflect transmitted signals. It will be understood by those of skill in the art that many other environments also have sources of reflection. The term urban environment is typically used herein to describe these possible areas. However, other possible signal reflective areas are possible, for example, mountainous areas. It will be understood by those of skill in the art that examples given that refer to urban areas will typically also apply to other areas.

Due to the urban environment 65 a signal 154 transmitted from the base station 52 to the mobile handset 54 is reflected. Reflected signals can be difficult to synchronize with. This difficulty can be, for example, due to the fact that the delay from transmission at the base station to reception at the mobile station is difficult to estimate since the distance traveled is difficult to estimate. If the mobile handset is located in an urban environment, or any environment that has many possible sources of reflection signal acquisition can be adjusted accordingly. Such as, for example, when the mobile handset is attempting to synchronize the locally generated spreading code with the spreading code from the base station the range of possible chip delays considered can be increased in a highly communication signal reflective environment, such as an urban area 65.

Figure 4:
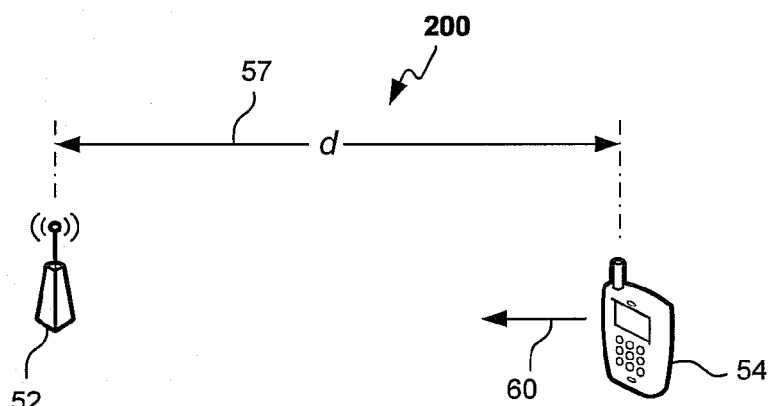
FIG. 4 shows a mobile station in motion toward a base station.

Referring now to FIG. 4 a diagram 200 will be discussed. The diagram 200 shows another possible examples of how location and motion complicate the synchronization process. Specifically, the diagram 200 shows a mobile station 54 traveling at a velocity 60 towards a base station 52. The velocity 60 leads to a Doppler frequency shift. Doppler frequency shift will be discussed in more detail with respect to FIG. 5. Additionally, due to the velocity 60 the distance 57 is constantly changing. The change in distance leads to a constant change in chip delay. One advantage to using velocity to help improve signal acquisition is that chip delay estimations can be updated as the position of the mobile handset changes.

Figure 5:
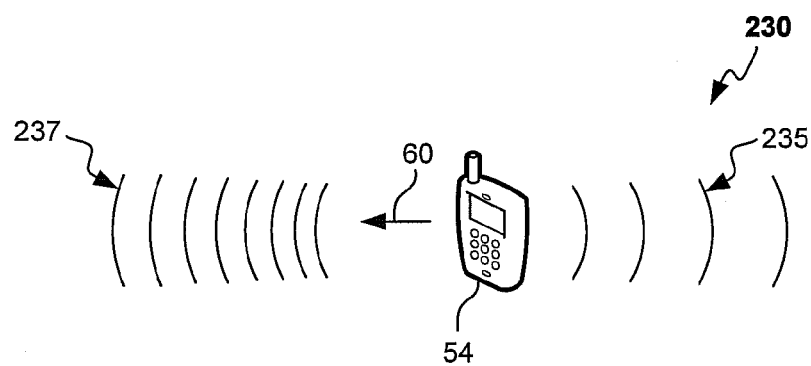
FIG. 5 is a diagram that shows a representation of a Doppler shift due to the motion of a mobile handset.

As stated above, the velocity 60 leads to a Doppler frequency shift. Doppler frequency shift will now be discussed in more detail with respect to FIG. 5. FIG. 5 shows a diagram 230. The diagram 230 shows the mobile handset 54 moving at velocity 60. As the mobile handset moves, it can be seen that the electromagnetic waves are closer together in the direction of travel and farther apart behind the mobile handset 54. The higher frequency 237 electromagnetic waves are shown in front of the mobile handset 54. Lower frequency 235 electromagnetic waves are shown behind the mobile handset 54. Many people have experienced this phenomenon with respect to sound. One example is the horn on a train that seems to change frequency as the train travels by. One advantage to using a relative velocity estimate to estimate Doppler frequency shift is that the frequency that the mobile handset should use for signal acquisition can be more accurately estimated.

Figure 6:
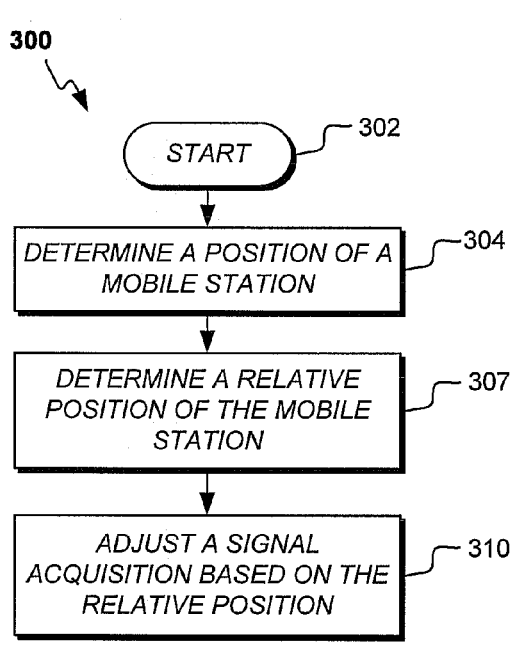
FIG. 6 is a flowchart that shows adjusting signal acquisition based on relative position.

Referring now to FIG. 6 a flowchart 300 will be discussed. The flowchart shows a high level overview of using position as part of signal acquisition. The flowchart 300 begins at 302. In step 304 the position of the mobile station is determined. Position can be determined, as stated with respect to FIG. 1 using the global positioning system, however, other positioning systems are possible. The flowchart 300 continues with step 307. In step 307 the relative position of the mobile is determined. This may, for example, be determined using a known position of the base station and comparing it to the position determined in step 304. The flowchart 300 continues at step 310. At step 310 signal acquisition is adjusted based on the relative position. The flowchart 300 is general. Specific examples of how signal acquisition is adjusted have been discussed with respect to FIGS. 2, 3, and 4. Note that FIG. 5 discussed changing signal acquisition based on velocity, change in position. These examples will be discussed further with respect to FIGS. 7, 8, and 9.

Figure 7:
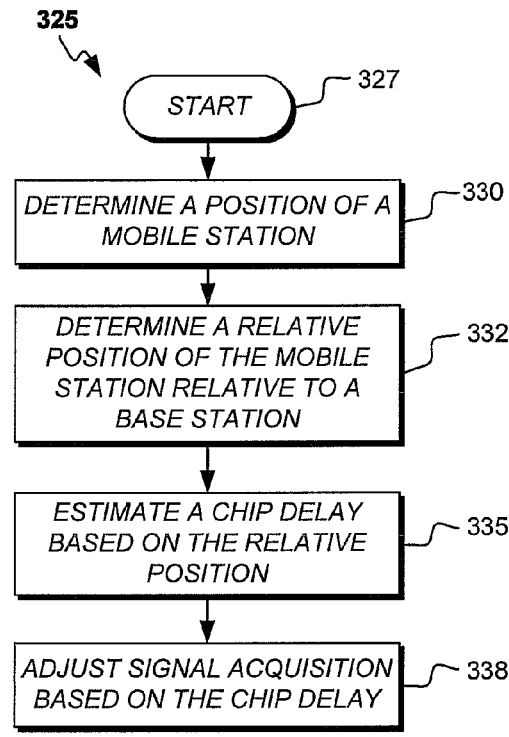
FIG. 7 is a flowchart that shows adjusting signal acquisition based on an estimated chip delay.

FIG. 7 is similar to FIG. 6. In FIG. 7 the adjustment to signal acquisition is an adjustment based on chip delay. FIG. 7 is a flowchart 325. The flowchart begins at 327. Step 330 of FIG. 7 is similar to step 304 of FIG. 6. In step 330 the position of a mobile station is determined. In step 332 the relative position of the mobile station is determined. Step 332 is similar to step 307 of FIG. 6. The flowchart continues with step 335. In step 335 chip delay is estimated based on the relative position estimated in step 332 and signal acquisition is adjusted based on the chip delay in step 338. Step 338 is similar to step 310 of FIG. 6. An advantage to adjusting signal acquisition based on chip delay is that in some cases the signal acquisition may be performed more quickly.

Figure 8:
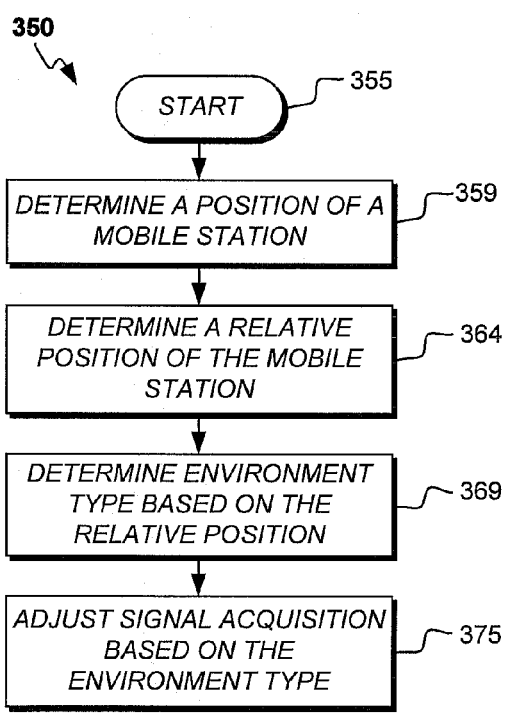
FIG. 8 is a flowchart that shows adjusting signal acquisition based an environment type.

FIG. 8 is similar to FIGS. 6 and 7. In FIG. 8 the adjustment to signal acquisition is an adjustment based on environment type. FIG. 8 is a flowchart 350. The flowchart begins at 355. Step 359 of FIG. 7 is similar to step 304 of FIG. 6 and step 330 of FIG. 7. In step 359 the position of a mobile station is determined. In step 364 the relative position of the mobile station is determined. Step 364 is similar to step 307 of FIG. 6 and step 332 of FIG. 7. The flowchart continues with step 369. In step 369 environment type is determined based on the relative position estimated in step 364 and signal acquisition is adjusted based on the environment type in step 375. Step 375 is similar to step 310 of FIG. 6 and step 338 of FIG. 7. An advantage to adjusting signal acquisition based on environment type is that the mobile handset, as stated above with respect to FIG. 3 can use a greater range of possible chip delays due to the uncertainty of the distance the transmitted signal has traveled and therefore the delay time.

Figure 9:
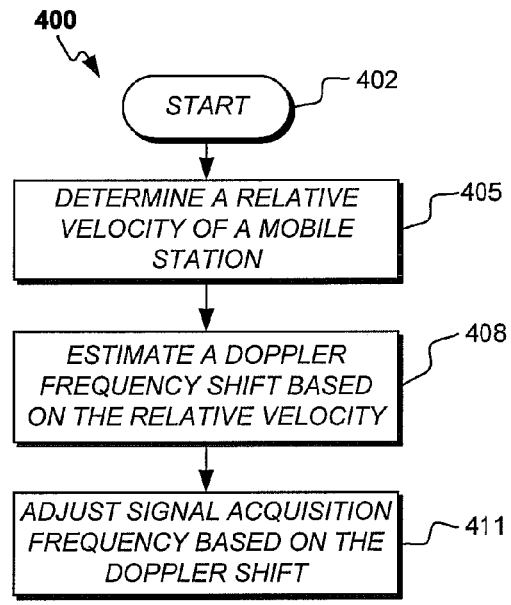
FIG. 9 is a flowchart that shows adjusting signal acquisition based on an estimated Doppler shift.

FIG. 9 is similar to FIGS. 6, 7, and 8. For brevity, FIG. 9 will be compared to FIG. 6. In FIG. 9 velocity is determined and used to estimate a Doppler frequency shift. FIG. 9 is a flowchart 400. The flowchart begins at 402. Step 405 of FIG. 9 is similar to step 304 of FIG. 6. However, velocity is determined instead of location. In step 408 a Doppler frequency shift is estimated. The Doppler frequency shift is used to adjust signal acquisition in step 411. Step 411 in FIG. 9 is similar to step 310 in FIG. 6. Both are a signal acquisition adjustment step. As stated with respect to FIG. 5, an advantage of using a relative velocity estimate to estimate Doppler frequency shift is that the frequency that the mobile handset should use for signal acquisition can be more accurately estimated.

Figure 10:
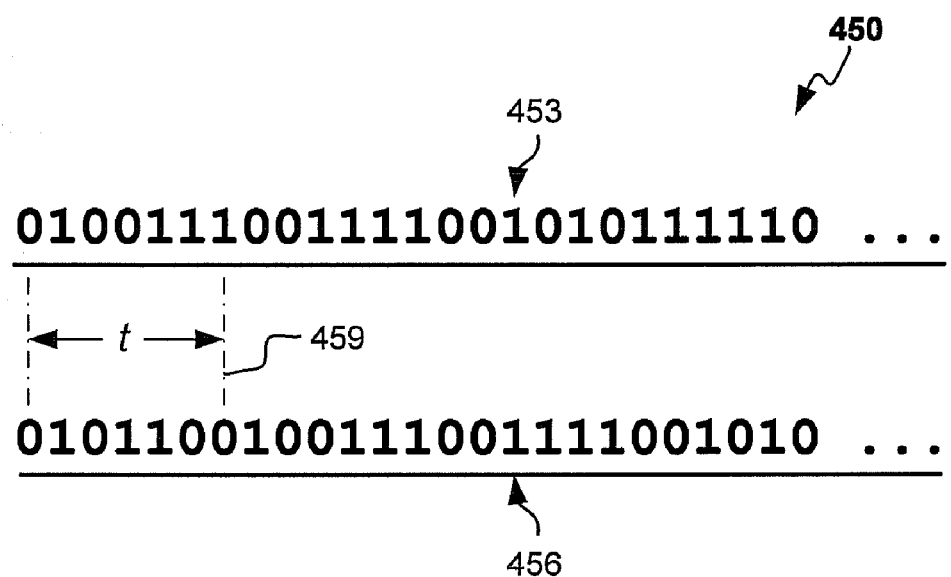
FIG. 10 is a diagram that shows a chip delay between a spreading code and a locally generated spreading code.

Referring now to FIG. 10, a diagram 450 is shown. The diagram 450 depicts two versions of a pseudo-random sequence. The first pseudo-random sequence 453 could be, for example, the sequence used by a base station. The second pseudo-random sequence 456 could be, for example, the sequence used by a mobile. In order for the base station and the mobile station to communicate, the sequence used to transmit at the base station, must be synchronized to the sequence used to receive at the mobile station and the sequence used to transmit at the base station must be synchronized to the sequence used to receive at the mobile station. Typically, the same sequence is used; however, the sequences will be offset due to the distance between the base station and the mobile station.

As shown on FIG. 10 the second pseudo-random sequence 456 is offset from the first 453 by some amount of time 459. Each sequence contains the same synchronization word. In order to synchronize the base station to the mobile station the sequences are correlated. The goal is to align the synchronization words in time. Aligning the synchronization words in time results in aligning the symbols of the synchronization words. When they are aligned the base station and the mobile station are synchronized and can communicate with each other.

This process can be sped up by making a better initial approximation of how far off the synchronization word in the mobile station is from the synchronization word in the base station.

By estimating the amount of time 459 as described with respect to FIG. 2, that described estimated chip delay, 57 of FIG. 2, the two pseudo-random sequences, 453 and 456 may be more quickly aligned.

Figure 11:
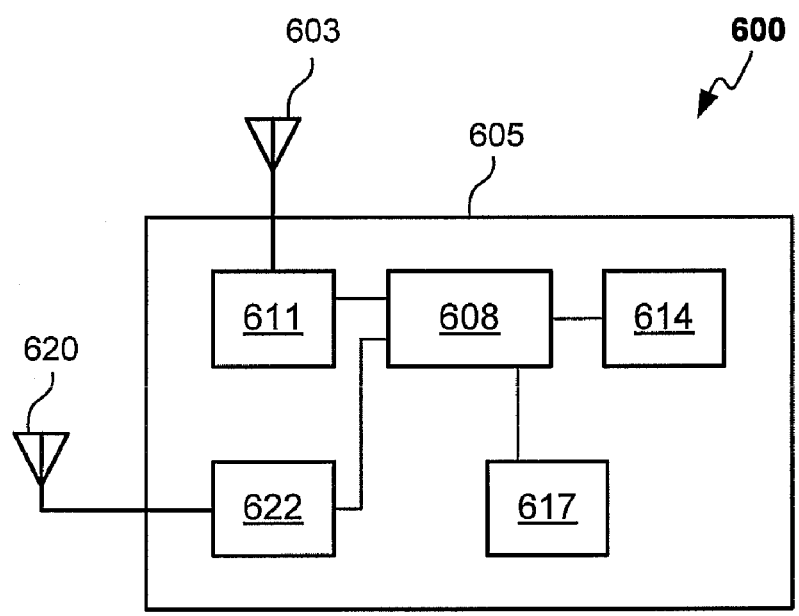
FIG. 11 is a diagram of a mobile station in the form of a mobile handset.

Referring now to FIG. 11, a mobile station in the form of a mobile handset 600 is shown. The mobile handset 600 includes an antenna 603. The antenna is connected to a position-determining device 611. The position-determining device 611 may be a device that uses global positioning satellites to determine position. The position-determining device 611 is connected to a processor. The processor is capable of implementing the methods described with respect to the flowcharts FIGS. 6, 7, 8, and 9. The processor 608 may be a stand-alone processor, or multiple processors. Additionally, it may be include stand-alone digital logic. The processor is coupled to a memory 614. The memory is used to store information needed by the processor. Additionally, the processor 608 is coupled to a transceiver 622. The transceiver 622 is connected to a second antenna 620 and used to send and receive signals from a communication network, typically a base station. A mobile power source in the form of the battery 617 is coupled to the processor 608 and supplies power to the processor. It should be noted that the mobile power source could be a fuel cell, or other type of transportable power source. Additionally, the mobile power source could include a combination of power sources, such as, for example a battery and a fuel cell. Additionally, the processor 608 and typically most other components are enclosed in a case 605 that protects the components.

Global positioning satellites are not the only way position can be determined. Position information can be stored at a base station and transmitted to a mobile station. These methods can also be applied to mobile to mobile communication. In this case for example, a base station could transmit the location of a second mobile station to facilitate communication between a first mobile station and the second mobile station.

Several examples have been discussed using mobile stations and base stations. However, as was stated above any transmitter and receiver can be used. For example, mobile station to mobile station communication is possible. Additionally, for example, acquiring signals from another air-interface is possible. Usually, in CDMA systems each mobile station has a list of known PN-codes for neighboring base stations. If propagation delay and velocity is known in advance this acquisition could be faster. Additionally, the mobile station could acquire any other spread spectrum system. For example, 802.11 systems using a similar method. As stated above, inter-system acquisition is possible.

What is claimed is:

1. A method of improving signal acquisition in a digital communication system comprising the steps of:
   (a.) determining a position of a mobile station;
   (b.) determining a relative position of the mobile station relative to a base station;
   (c.) estimating a chip delay based on the relative positions of the base station and the mobile station;
   (d.) adjusting the signal acquisition based on the estimated chip delay.

2. The method of claim 1 wherein the adjusting step (d.) includes changing a pseudo-random code offset.

3. The method of claim 1 including the additional steps of:
   (e.) receiving base station position;
   (f.) storing base station position.

4. The method of claim 1 wherein the estimated chip delay is used to estimate the a timing of the spreading code.

5. The method of claim 1 including the additional steps of:
   (e) determining velocity;
   (f) updating the chip delay estimate based on velocity.

6. A method of improving signal acquisition in a digital communication system comprising the steps of:
   (a.) determining a position of a mobile station;
   (b.) determining a relative position of a mobile station relative to a base station;
   (c.) determining environment type based on relative position;
   (d.) adjusting signal acquisition based on the environment type.

7. A method of improving signal acquisition in a digital communication system comprising the steps of:
   (a.) determining a relative velocity of a mobile station with respect to a base station;
   (b.) estimating a Doppler frequency shift based on the relative velocity of the mobile station;
   (c.) adjusting signal acquisition frequency based on the Doppler shift.

8. A mobile station comprising;
   a position determination device;
   a processor coupled to the position determination device and configured to perform the following steps:
   (a.) determining a position of a mobile station from the position determination device;
   (b.) determining a relative position of the mobile station relative to a base station;
   (c.) estimating a chip delay based on the relative positions of the base station and the mobile station;
   (d) adjusting the signal acquisition based on the estimated chip delay;
   a memory coupled to the processor;
   a transceiver coupled to the processor and configured to transmit and receive signals;
   a first antenna coupled to the position determining device;
   a second antenna coupled to the transceiver;
   a mobile power source configured to power the processor;
   a case enclosing the processor.

9. The mobile station of claim 8 wherein the first antenna and the second antenna are the same antenna.

10. The mobile station of claim 8 wherein the mobile station is a mobile handset.

11. The mobile station of claim 8 wherein the adjusting step (d) includes changing a pseudo-random code offset.

12. The mobile station of claim 8 wherein the position determining device is a device that uses global positioning satellite signals to determine position.

13. A mobile station comprising:
    a position determination device;
    a processor coupled to the position determination device and configured to perform the following steps:
    (a.) determining a position of a mobile station from the position determination device;
    (b.) determining a relative position of a mobile station relative to a base station;
    (c.) estimating a chip delay based on the relative positions of the base station and the mobile station;
    (d) adjusting the signal acquisition based on the estimated chip delay;
    a memory coupled to the processor;
    (e) receiving a position of a base station;
    (f) storing base station position;
    a memory coupled to the processor;
    a transceiver coupled to the processor and configured to transmit and receive signals;
    a first antenna coupled to the position determining device;
    a second antenna coupled to the transceiver;
    a mobile power source configured to power the processor;
    a case enclosing the processor.

14. The mobile station of claim 13 wherein the first antenna and the second antenna are a single antenna.

15. The mobile station of claim 13 wherein the mobile station is a first mobile station and the position determining device is a second mobile station that transmits position to the first mobile station.

16. A mobile station comprising:
    a position determination device;
    a processor coupled to the position determination device and configured to perform the following steps:
    (a.) determining a position of a mobile station from the position determination device;
    (b.) determining a relative position of a mobile station relative to a base station;
    (c.) determining environment type based on relative position;
    (d) adjusting the signal acquisition based on the environment type;
    a memory coupled to the processor;
    a mobile power source configured to power the processor.

17. A mobile station comprising:
    a position determination device;
    a processor coupled to the position determination device and configured to perform the following steps:
    (a.) determining a relative velocity of a mobile station with respect to a base station;
    (b.) estimating a Doppler frequency shift based on the relative velocity of the mobile station;
    (c.) adjusting signal acquisition frequency based on the Doppler shift;
    a memory coupled to the processor;
    a mobile power source configured to power the processor.

* * * * *